United States Patent [19]

Leyrer et al.

[11] Patent Number: 5,643,542
[45] Date of Patent: Jul. 1, 1997

[54] PROCESS FOR SIMULTANEOUSLY REDUCING THE AMOUNTS OF HYDROCARBONS, CARBON MONOXIDE AND NITROGEN OXIDES CONTAINED IN THE EXHAUST GAS FROM AN INTERNAL COMBUSTION ENGINE

[75] Inventors: Juergen Leyrer; Rainer Domesle, both of Alzenau; Egbert Lox, Hanau; Klaus Ostgathe, Hattersheim, all of Germany

[73] Assignee: Degussa Aktiengesellschaft, Frankfurt, Germany

[21] Appl. No.: 542,124

[22] Filed: Oct. 12, 1995

[30] Foreign Application Priority Data

Oct. 15, 1994 [DE] Germany .................... 44 36 890.9

[51] Int. Cl.$^6$ .................................................. B01D 47/00
[52] U.S. Cl. ........................ 423/212; 502/64; 502/66
[58] Field of Search ............................ 423/212; 502/64, 502/66

[56] References Cited

U.S. PATENT DOCUMENTS

| | | | |
|---|---|---|---|
| 4,621,071 | 11/1986 | Blanchard et al. | 502/302 |
| 4,624,940 | 11/1986 | Wan et al. | 502/251 |
| 4,904,633 | 2/1990 | Ohata et al. | 502/304 |
| 5,045,519 | 9/1991 | Meyer et al. | 502/235 |
| 5,137,863 | 8/1992 | Matsuura et al. | 502/328 |
| 5,157,007 | 10/1992 | Domesle et al. | 502/66 |
| 5,242,883 | 9/1993 | Ichikawa et al. | 502/439 |
| 5,275,795 | 1/1994 | Montreuil et al. | 423/212 |
| 5,338,715 | 8/1994 | Iida et al. | 502/64 |
| 5,354,720 | 10/1994 | Leyrer et al. | 502/64 |

OTHER PUBLICATIONS

Armor, J.N. Environmental Catalysis, p. 40 1994.
Kirk–Othmer Encyclopedia of Chemical Technology, 3rd Ed., vol. 5, pp. 48 and 49. 1979.
Kirk–Othmer Encyclopedia of Chemical Technology, 3rd Ed., vol. 15, pp. 638–639. 1981.

*Primary Examiner*—Deborah Jones
*Assistant Examiner*—Amy M. Harding
*Attorney, Agent, or Firm*—Beveridge, DeGrandi, Weilacher & Young, L.L.P.

[57] ABSTRACT

A process for simultaneously reducing the amounts of hydrocarbons, carbon monoxide and nitrogen oxides contained in the exhaust gas from an internal combustion engine in the exhaust gas from gasoline or diesel engines with high amounts of oxygen in the exhaust gas is disclosed. A high reductive effect towards nitrogen oxides is enabled by using a homogeneous aluminum silicate as a high surface area support material for the catalytically active components.

16 Claims, No Drawings

PROCESS FOR SIMULTANEOUSLY REDUCING THE AMOUNTS OF HYDROCARBONS, CARBON MONOXIDE AND NITROGEN OXIDES CONTAINED IN THE EXHAUST GAS FROM AN INTERNAL COMBUSTION ENGINE

INTRODUCTION AND BACKGROUND

The present invention relates to a process for simultaneously reducing the amounts of hydrocarbons, carbon monoxide and nitrogen oxides in the exhaust gas from an internal combustion engine by passing the exhaust gas over a catalyst formed of a gas-permeable inert support with a catalytically active coating which contains at least one high surface area support material, at least one metal from the platinum group, and optionally one or more base metal compounds.

In order to simultaneously remove pollutants in the exhaust gas from internal combustion engines, hydrocarbons and carbon monoxide have to be oxidized in an oxidation reaction and at the same time the nitrogen oxides have to be reduced in a reduction reaction. These conflicting requirements are only satisfied by using so-called three-way catalytic converters with simultaneous control of the standardized air/fuel ratio, represented by lambda, to a value of approximately 1. The standardized air/fuel ratio lambda is defined as the ratio of the actual amount of air required for 1 kg of fuel to the amount of air for stoichiometric combustion of the fuel. Only with lambda values of approximately 1 can degrees of conversion of approximately or greater than 90% be produced for all three types of pollutants (i.e., hydrocarbons, carbon monoxide, and nitrogen oxides) using three-way catalytic converters.

For modern engines which use petrol and/or gas (e.g., so-called lean-burn engines), there are engine production designs which operate with standardized air/fuel ratios greater than 1 (i.e., with an excess of air and thus also of oxygen) with the objective of saving fuel. This excess oxygen is also found in the exhaust gas.

The exhaust gas from lean-burn engines has a proportion of oxygen in the exhaust gas of more than 1 vol.% during the greater part of the operational life of the engine under normal driving conditions. This so-called "lean" operating mode may change to the "fat" or stoichiometric mode with an excess of fuel during relatively short acceleration phases. The mode of operation of lean-burn engines therefore resembles that of diesel engines, whose exhaust gas also normally contains more than 1 vol.% of oxygen.

Known exhaust gas purification processes, under lean-burn exhaust gas conditions, enable only the hydrocarbons and carbon monoxide contained in the exhaust gas to be converted into water and carbon dioxide by oxidation with the assistance of an oxidation catalyst. Thus, there is the risk that nitrogen monoxide (NO) also contained in the exhaust gas is partially converted by oxidation into nitrogen dioxide ($NO_2$) which has negative effects of the environment. Furthermore, there is the risk that sulphur dioxide ($SO_2$) also present in the exhaust gas is further oxidized to sulphur trioxide ($SO_3$) which has negative effects of the environment, too. Special catalyst formulations have been developed to avoid these unwanted oxidations.

Thus, for example, DE 39 40 758 (U.S. Pat. No. 5,157,007 which is incorporated by reference in its entirety) describes a catalyst for the oxidative purification of exhaust gases from diesel engines with a high capacity for converting hydrocarbons and carbon monoxide at low temperatures and with an inhibited oxidizing effect towards nitrogen monoxide and sulphur dioxide. This catalyst contains a catalytically active coating, which consists of finely divided, high surface area aluminum oxide, titanium oxide and/or silicon dioxide on the channels through which the gas freely flows in a solid, honeycomb-shaped, inert support made of ceramic or metal.

A high surface area support material in the context of the present invention and DE 39 40 758 is understood to be a material whose specific surface area (determined in accordance with DIN (German Industrial Standard) 66132 by Brunauer, Emmet and Teller's method (BET surface area)) is larger than 10 $m^2/g$.

These finely divided, high surface area substances must be thermally stable in order to prevent the specific surface area of the materials from being essentially reduced at the operating temperatures of the catalyst and thus decreasing the catalytic activity of the catalyst. Substances which are sufficiently thermally stable are those which still qualify as having high surface areas even after several hours of thermal stress at temperatures of at least 700° C.

Onto the finely divided, high surface area substances from DE 39 40 758 are deposited platinum and/or palladium and a vanadium component as catalytically active components. The vanadium component in this catalyst largely prevents the further oxidation of nitrogen monoxide and sulphur dioxide. With this catalyst, hydrocarbons and carbon monoxide are highly and efficiently converted into harmless components. However, reduction of nitrogen oxides to nitrogen does not occur, and nitrogen monoxide and sulphur dioxide pass through the catalyst virtually unchanged.

SUMMARY OF THE INVENTION

An object of the present invention is to provide a process which enables the purification of exhaust gas from lean-burn gasoline engines and from diesel engines to be improved by means of additional reduction of the nitrogen oxides. This object and others are achieved by a process for simultaneously reducing the amounts of hydrocarbons, oxygen-containing organic compounds (e.g., alcohols and aldehydes), carbon monoxide and nitrogen oxides contained in the exhaust gas from an internal combustion engine by passing the exhaust gas over a catalyst made from a gas-permeable inert support with a catalytically active coating which contains at least one high surface support material, at least one metal from the platinum group, and optionally one or more base metal compounds.

The process of the invention is carried out such that exhaust gas from the internal combustion engine has an excess of oxygen during the greater part of the operation cycles of the engine and the high surface area support material contains an aluminum silicate which still has a specific surface area of at least 150 $m^2/g$ after calcining for 7 hours at 950° C. in a synthetic exhaust gas consisting of 10 vol.% of carbon dioxide, 6 vol.% of oxygen, 10 vol.% of water vapor and with the remainder being nitrogen.

DETAILED DESCRIPTION OF THE INVENTION

According to a more detained aspect of the present invention, the essential factor in the process according to the present invention is the use of an aluminum silicate, which is stable at high temperatures, with a homogeneous distribution of the elements aluminum and silicon, wherein however the aluminum silicate used is not a zeolite. Tests using X-ray diffraction show, for this type of aluminum silicate, the crystal structure of e.g. an aluminum oxide from the transition series such as γ-aluminum oxide. The precursors of aluminum silicate which can be used, optionally mixed with aluminum silicate, can have the crystal structure of e.g. boehmite. In addition, this type of aluminum silicate and its precursors contain amorphous fractions (i.e., fractions not accurately identifiable by means of X-ray photography) which increase with the silicon dioxide content. The precursors of aluminum silicate are converted into the aluminum silicate in accordance with the invention at the latest at the exhaust gas temperatures produced by an internal combustion engine.

Aluminum silicates and their precursors with 0.5 to 70 wt.% of silicon dioxide are preferred. These materials may optionally contain homogeneously incorporated elements which form oxides which are stable at high temperatures. Suitable elements are, for instance, rare earths (i.e., elements Sc, Y, and elements 57–71 of the Periodic Table of Elements) such as lanthanum and cerium, as well as zirconium and the alkaline earth metals (i.e., Ca, Sr, Ba, and Ra), which are incorporated in the form of suitable precursor compounds. The amounts of these elements are preferably up to 10 wt.%, calculated as the oxide.

High amounts of alkali metal (i.e., Li, Na, K, Rb, Cs, Fr), such as for instance sodium, have proven to be unsuitable. Highly suitable aluminum silicates have an alkali metal (e.g., sodium) content, calculated as the oxide, of less than 75 ppm.

The homogeneous distribution of elements which is required, at least as regards aluminum and silicon, cannot be obtained by conventional processes for stabilizing aluminum oxide. Also, physical mixtures of aluminum oxide and silicon dioxide are not suitable for the process according to the invention.

A particularly suitable aluminum silicate is described in DE 38 39 580 (U.S. Pat. No. 5,045,519 which is incorporated by reference in its entirety along with U.S. Pat. Nos. 5,055,019 and 4,590,289), where aluminum silicate is obtained by mixing an aluminum compound with a silicic acid compound in aqueous medium, drying, and optionally calcining the product. An aluminum $C_2$–$C_{20}$-alcoholate which has been dehydrolyzed with water purified by means of an ion exchanger is used as an aluminum compound. 0.1–5.0 wt.% of an orthosilicic acid solution purified with an ion exchanger are added to the hydrolysis water. Alternatively, a 0.1–5.0 wt.% orthosilicic acid purified with an ion exchanger can be added to the alumina/water mixture obtained by neutral hydrolysis. This particularly suitable aluminum silicate may contain additives of lanthanum oxide or other rare earth oxides.

Other high surface area support materials which may be contained in the coating, in addition to aluminum silicate or its precursor compounds (e.g. the hydroxide), are other high surface area substances such as silicon dioxide, titanium oxide, zirconium oxide, thermally stable zeolites, aluminum oxide, magnesium oxide or mixtures thereof or their precursor compounds such as, for example, their hydroxy compounds. These substances are used, for example, in order to improve the processability of the aluminum silicate during its application to the support. Furthermore, they may, for example, in the form of a sol, increase adhesion of the aluminum silicate to the support or may even be used to adjust the porosity of the coating to a suitable value. For this purpose, they are generally used in amounts of up to 50 wt.%, preferably up to 25 wt.%, with respect to the weight of coating.

It is advantageous for the process according to the present invention if the catalytically active coating of the catalyst contains, as base metal compounds, one or more non-volatile compounds, preferably oxides, of molybdenum, tungsten, vanadium, zirconium, hafnium, germanium, manganese, iron, nickel, cobalt, zinc, copper and silver, or of alkali metals (i.e., Li, Na, K, Rb, Cs, Fr) and alkaline earth metals (Ca, Sr, Ba, Ra) or of rare earth metals (i.e., elements Sc, Y, and elements 57–71 of the Periodic Table of Elements). Vanadium oxide and/or tungsten oxide are preferably used if it is a matter of suppressing the further oxidation of sulphur dioxide to sulphur trioxide during purification of the exhaust gas. In the case of purifying exhaust gases with elevated $SO_2$ contents, such as for instance diesel engine exhaust gas, this also leads to a reduction in the emissions of particles which would otherwise be promoted by the formation of sulfates. Compounds of sulphide-producing elements such as iron, nickel, calcium, strontium and barium are used to suppress $H_2S$ emissions during the transfer from lean-burn to fat mode of operation. The $NO_x$ conversion of the catalyst according to the invention can be further increased by means of alkali metal and alkaline earth metal compounds.

The amount of catalytically active coating applied to the support depends on the type and geometric surface area of the support which is available for application of the coating. The catalytically active coating is preferably present on the support in an amount of 20 to 400 g/l of support volume. It contains 0.01 to 25 g/l of platinum group metals (Tc, Os, Ir, Pt, Tc, Ru, Rh, Pd, and mixtures thereof) and optionally up to 100 g/l of base metal compounds (calculated as oxide). Platinum, palladium, rhodium and iridium from the platinum metals and vanadium oxide and/or tungsten oxide as base metal compounds are preferably used for the catalyst, wherein platinum and palladium in particular give good results.

Usually, with high coating concentrations on the support, there are also high concentrations of platinum group metals and base metal compounds. The ratio of the total amount of catalytically active coating to the amount of platinum group metals and to the optionally present amounts of base metal compounds (calculated as oxide) is preferably less than 500.

Supports which are suitable for the catalytically active coating are honeycomb-shaped structures made of ceramic or metal of any design. However, filter structures for filtering diesel exhaust gases made of expanded ceramics or so-called wall-flow filters in the form of honeycomb structures with selectively blocked exhaust gas channels may also be used as supports. Such supports are well known in the art.

Solid structures with exhaust gas channels which present no resistance to flow, however, are preferably used, wherein the density of exhaust gas channels over the cross-section of the structure (commonly referred to as the cell density) is between 7 and 200 $cm^{-2}$ and the partitions between the channels are between 0.02 and 0.3 mm thick, depending on the cell density and the material in the solid structure.

The catalyst required for the process according to the present invention may be prepared in a variety of ways known in the art. Normally, an aqueous dispersion with a high solids content is made up first, this containing aluminum silicate or its precursors and optionally at least one other high surface area component and optionally base metal compounds. The inert support for the catalyst is coated with this dispersion in a manner known per se. This is achieved, for example, by immersing the inert support in the aqueous dispersion once or several times and then blowing out any blocked exhaust gas flow channels. Alternatively, the aqueous dispersion may also be pumped into the support or pulled through it under suction in order to coat the support.

In this way the support is coated with finely divided aluminum silicate and optionally other components. The coating is then dried. This may take place either at room temperature or at elevated temperatures of up to about 200° C. for a sufficient period of time as will be apparent to those skilled in the art. Calcination at temperatures above 250° C., preferably between 300° and 800° C. generally follows the drying procedure for a sufficient period of time as will be apparent to those skilled in the art. The coating produced in this way can then be impregnated with the assistance of soluble precursor compounds of platinum group metals. The catalyst precursor obtained in this way is then dried again. The precursors of platinum metals are then calcined at elevated temperatures of up to about 800° C. in the conventional manner, optionally in a gas stream which contains hydrogen. The catalyst is then covered with precursors of base metal compounds or with the base metal compounds themselves by means of impregnation. This renewed impregnation is followed by at least one drying procedure and optionally by decomposition of the base metal compound precursors at elevated temperature. Soluble precursor compounds of platinum group metals and soluble base metal compounds may optionally be applied in a single impregnation step.

As an alternative to the method of preparation described above, the base metal compounds may also be introduced after coating the support and before applying the platinum group metals. Basically, the catalyst being used according to the present invention, as the details given above show, may be prepared in many different ways, wherein the number of impregnation steps should be restricted to a few steps for economic reasons. A method of preparation is preferred in which all the components for the catalytic coating are present in one dispersion and are applied together to the support. If base metal compounds are present in the dispersion, they may be present therein in dissolved and/or non-dissolved form.

Suitable precursors for platinum group metals are any customary salts and complexes of the same known in the art. Examples of such compounds are hexachloroplatinic acid, tetrachloroplatinic acid, diamminedinitroplatinum(II), tetraammineplatinum(II) chloride, ammonium tetrachloroplatinate(II), ammonium hexachloroplatinate (IV), platinum ethylenediamine chloride, tetraammineplatinum(II) nitrate, tetraammineplatinum(II) hydroxide, platinum nitrate, palladium chloride, palladium nitrate, diamminedinitropalladium(II), tetraamminepalladium(II) hydroxide and hexachloroiridic acid.

Suitable compounds for introducing the important base metal vanadium are any water-soluble or partially water-soluble vanadium compounds known in the art such as potassium metavanadate, sodium metavanadate and vanadium pentoxide or precursor compounds such as vanadyl oxalate, vanadyl formate and ammonium metavanadate. The latter are converted into vanadium pentoxide by thermal treatment of the catalyst precursor. Suitable for introducing tungsten are ammonium metatungstate, ammonium paratungstate, tungsten trioxide, sodium tungstate and tungstic acid. Other base metals such as nickel, iron and cerium may be introduced as oxides, and alkali and alkaline earth metals are readily introduced as salts of organic acids, for instance as acetates.

For a high rate of conversion of nitrogen oxides, a degree of dispersion $D_{PM}$ of platinum group metals in the freshly produced catalyst (Engler et al., Applied Catalysis (1989), volume 48, pages 71–92) of between about 30 and 70% has proven unexpectedly advantageous. However, degrees of dispersion which differ from this may still lead to satisfactory results, depending on the composition of the catalyst.

The degree of dispersion $D_{pM}$ in the context of this invention refers to the ratio of the surface area of the metal, experimentally determined by CO chemisorption, to the theoretically possible surface area of metal on complete dispersion of the metal in the form of a monolayer with $D_{PM}=100\%$.

The process according to the invention, as compared with the processes known from the prior art in accordance with DE 39 40 758, is characterized in that for approximately the same rates of conversion for hydrocarbons and carbon monoxide and approximately the same oxidation inhibiting effect towards sulphur dioxide, a clear reduction in nitrogen oxides, especially nitrogen monoxide, is surprisingly produced. In addition, greatly improved rates of conversion of oxygen-containing organic compounds such as, for example, alcohols and aldehydes, are unexpectedly obtained by the process according to the present invention.

The process according to the present invention is capable of converting the nitrogen monoxide in the exhaust gases from diesel engines or lean-burn operated petrol engines into harmless nitrogen, even with oxygen concentrations in the exhaust gas of up to 12 vol.%, with rates of conversion of up to 60%, depending on the catalyst formulation, at engine speeds of 50,000 h$^{-1}$. At lower engine speeds, the rates of conversion of nitrogen oxides rise accordingly. This is a significant and unexpected advance as compared with the process known from the prior art, which at best has hitherto been capable of inhibiting further oxidation of nitrogen monoxide to nitrogen dioxide. Reduction of nitrogen monoxide to nitrogen, as is now enabled by the process according to the present invention, has hitherto not been possible using the process known from the prior art.

This essential improvement in exhaust gas purification behavior was made possible by the use of thermally stable aluminum silicate or its precursor compounds as a support for the catalytically active components. Both of these substances are characterized by a largely uniform distribution of the elements aluminum and silicon. The aluminum silicate being used according to the present invention thus differs fundamentally from the mixture proposed in DE 39 40 758 which consists of discrete aluminum oxide and silicon dioxide particles. A reduction in the amount of nitrogen oxide in an oxygen-containing exhaust gas is not possible using this purely physical mixture in DE 39 40 758.

The following examples are illustrative of the present invention are intended to explain the advantageous properties of the exhaust gas purification process according to the present invention:

Comparisom Example 1 (C1)

A comparison catalyst with a physical mixture of aluminum oxide and silicon dioxide as support oxides for the catalytically active components was prepared in the same way as described in DE 39 40 758. For this purpose, an aqueous coating dispersion of aluminum oxide and silicon dioxide with a solids content of 40 wt.% was made up. The solids in the dispersion comprised 95 wt.% of γ-aluminum oxide with a specific surface area of 180 m²/g and 5 wt.% of silicon dioxide with a specific surface area of 100 m²/g.

The catalyst support used was a honeycomb-shaped, open-celled support made of cordierite with a 2.5 cm diameter, 7.6 cm length and with 62 cells or flow channels per cm² the flow channels had walls 0.2 mm thick. This support was coated with the aluminum oxide/silicon dioxide mixture, in an amount of 200 g of oxides per liter of support volume, by immersion in the coating dispersion. The coating was dried at 120° C. in air. After conditioning for a further 2 hours at 300° C., the coated support was impregnated with an aqueous solution of tetraammineplatinum(II) hydroxide. After renewed drying at 150° C. and two hours of conditioning at 300° C., the platinum compound was reduced in a forming gas stream (95 vol.% of $N_2$ and 5 vol% of $H_2$) at 500° C. for a period of 2 hours. The final catalyst contained 1.76 g of platinum per liter of support volume.

Comparisom Example 2 (c2)

A catalyst according to comparison example 1 was subsequently covered with 5 g of vanadium pentoxide per liter of support volume. To do this, the catalyst was soaked in a solution of vanadyl oxalate, dried at 120° C. and calcined for 2 hours at 400° C. to decompose the vanadyl oxalate.

For the following examples E1–E37 of the present invention, supports made out of cordierite with the same dimensions as in comparison example 1 were coated with differently composed aluminum silicates. The properties of the alumninum silicates used are listed in Table 1.

The last two columns in Table 1 give the specific surface areas measured by nitrogen adsorption in accordance with DIN 66132 using Brunauer, Emmett and Teller's method (BET surface area) for the freshly prepared state of the material and also after ageing in a synthetic exhaust gas for a period of 7 hours at 950° C. The synthetic exhaust gas was composed of 10 vol.% of carbon dioxide, 6 vol.% of oxygen, 10 vol.% of water vapor and the remainder was nitrogen.

Whereas the aluminum silicates being used according to the present invention still had a BET surface area of more than 150 $m^2/g$ even after ageing, the specific surface area of the physical mixture of aluminum oxide and silicon dioxide according to comparison examples C1 and C2 were reduced to only 95 $m^2/g$. Surprisingly, the aluminum silicates being used according to the present invention thus had an essentially higher surface area stability.

Comparison Example 3 (C3)

An aluminum oxide which contained silicon dioxide was prepared by impregnating a γ-aluminum oxide (specific surface area 180 $m^2/g$) in accordance with EP 0 184 506 (U.S. Pat. No. 4,766,101 which is incorporated by reference in its entirety) with an amount of tetraethoxysilane which was designed to provide a 5% concentration of silicon dioxide in the aluminum oxide. Afterwards the impregnated aluminum oxide was dried at 120° C. and then calcined at 500° C. for 1 hour. A catalyst in accordance with comparison example 1 was prepared using this material.

TABLE 1

| Example | $Al_2O_3$ content [wt. %] | $SiO_2$ content [wt. %] | BET surface area when freshly prepared [$m^2/g$] | BET surface area after aging [$m^2/g$] |
| --- | --- | --- | --- | --- |
| C1–C2 | 95[a] | 5[a] | 175 | 95 |
| C3 | 95[b] | 5[b] | 171 | 127 |
| E1–18 | 95 | 5 | 286 | 235 |
| E19 | 98.5 | 1.5 | 200 | 159 |
| E20 | 90 | 10 | 333 | 224 |
| E21 | 80 | 20 | 374 | 265 |
| E22 | 70 | 30 | 407 | 270 |
| E23 | 60 | 40 | 432 | 271 |
| E24–37 | 95 | 5 | 286 | 235 |

[a] as a physical mixture
[b] $SiO_2$ introduced as silica sol according to EP 0 184 506

EXAMPLE 1

An aqueous dispersion of an aluminum silicate with 5 wt.% of silicon dioxide and a specific surface area of 286 $m^2/g$ (Condea, Siralox 5/320) was made up. The cordierite support was coated with 200 g of oxide per liter of support volume in the same way as described in comparison example 1. Subsequent impregnation and final production of the catalyst were performed as in comparison example 1. The composition of this catalyst and of all the catalysts in the following examples are listed in Table 2.

EXAMPLES 2–4

Catalysts according to example 1 were impregnated with aqueous solutions of vanadyl oxalate at different concentrations and dried at 120° C. Decomposition of vanadyl oxalate to give vanadium pentoxide took place during 2 hours conditioning at 300° C.

EXAMPLES 5 and 6

Two catalysts with 140 and 100 g respectively of aluminum silicate per liter of support volume were prepared in the same way as in example 1.

EXAMPLES 7 and 8

Two catalysts with 140 and 100 g respectively of aluminum silicate per liter of support volume were prepared in the same way as in example 2.

EXAMPLES 9

A catalyst according to example 1 was impregnated with palladium instead of with platinum. An aqueous solution of palladium nitrate was used as impregnating solution.

EXAMPLE 10

A catalyst according to example 1 was impregnated with hexachloroplatinic acid as a platinum precursor and, instead of reducing in forming gas, was subjected to four hours conditioning at 300° C. in air containing 10 vol.% of water vapor.

EXAMPLE 11

A catalyst according to example 1 was impregnated with a solution of rhodium chloride in hydrochloric acid instead of with tetraamminoplatinum(II) hydroxide.

EXAMPLE 12

A catalyst according to example 1 was impregnated with a mixture of platinum and iridium in the ratio by weight of 2:1 instead of platinum. An aqueous solution of hexachloroplatinic acid and iridium chloride was used as impregnating solution.

EXAMPLE 13

A catalyst according to example 1 was produced with a mixture of platinum and palladium in the ratio by weight of 2:1 instead of platinum. An aqueous solution of tetraamminoplatinum(II) hydroxide and tetraammine palladium nitrate was used as impregnating solution.

EXAMPLE 14

A catalyst according to example 1 was impregnated with a mixture of platinum and rhodium in the ratio by weight of 5:1 instead of platinum. An aqueous solution of hexachloroplatinic acid and rhodium chloride was used as impregnating solution.

EXAMPLES 15–17

Three catalysts were prepared according to example 1 with 0.88, 0.44 and 0.22 g of platinum per liter of support volume respectively.

EXAMPLES 18–19

Catalysts according to example 1 were prepared, wherein the aluminum silicate being used according to the invention had a concentration of 1.5 or 10 wt.% of silicon dioxide.

EXAMPLES 20–22

Catalysts according to example 2 were prepared, wherein the aluminum silicate being used according to the invention had a concentration of 20, 30 and 40 wt.% of silicon dioxide respectively.

EXAMPLE 23

A catalyst according to example 1 was subsequently impregnated with potassium vanadate ($KVO_3$), dried and calcined overnight at 300° C. The amount of potassium vanadate was selected so that it corresponded to 5 g of vanadium pentoxide per liter of support volume.

EXAMPLE 24

To prepare the catalyst, a coating dispersion was made up with aluminum silicate (Condea, Siralox 5/320) and hexachloroplatinic acid was then added. After coating the support it was dried at 120° C., calcined at 300° C. for 2 hours and then reduced in a stream of forming gas as in example 1.

EXAMPLE 25

A catalyst according to example 24 was prepared with 3 g of vanadium pentoxide as described in example 2.

EXAMPLE 26

A catalyst provided with a vanadium component was prepared as described in example 24, wherein vanadyl oxalate, as a soluble precursor of the vanadium component, was added to the coating dispersion.

EXAMPLE 27

A catalyst according to example 26 was prepared without a final reduction stage.

EXAMPLE 28

A catalyst was prepared according to example 24. However, instead of the ceramic support made of cordierite, a similarly open-celled, honeycomb-shaped metal support with a diameter of 2.5 cm, a length of 7.5 cm and 62 cells or flow channels per $cm^2$, with each flow channel having a wall 0.04 mm thick, was used.

EXAMPLE 29

A catalyst according to example 2 was impregnated with ammonium metatungstate instead of vanadyl oxalate. The final catalyst contained 1.76 g of platinum and 10 g of tungsten oxide per liter of support volume.

EXAMPLE 30

A catalyst according to example 1 was prepared with a lanthanum-doped aluminum silicate (5 wt.% of $SiO_2$; 1.5 wt.% of $La_2O_3$), which had been produced in the same way as in example 7 of DE-PS 38 39 580.

EXAMPLE 31

A catalyst according to example 1 was prepared, wherein the coating dispersion contained an additional 5 wt.% of silicon dioxide with respect to the solids content of the dispersion. The additional Silicon dioxide had a specific surface area of 200 $m^2/g$.

EXAMPLE 32

A catalyst according to example 3 was prepared, wherein the coating dispersion also contained a zirconium oxide sol in the form of zirconium hydroxyacetate. The zirconium oxide content of the final coating was 10 wt.% with respect to the total amount of oxide in the coating.

EXAMPLE 33

A catalyst according to example 24 was prepared, wherein, after adding and adsorbing hexachloroplatinic acid onto the aluminum silicate, a ZMS5 zeolite (molar ratio $SiO_2:Al_2O_3=45$) exchanged with copper was added as another solid component of the coating dispersion. The ratio by weight of aluminum silicate to zeolite was 80:20. The zeolite was exchanged with 1.1 wt.% of copper, with respect to the weight of zeolite, within the scope of its ion-exchange capacity.

EXAMPLE 34

A catalyst according to example 1 was prepared, wherein the coating dispersion contained an additional 10 wt.% of manganese oxide (Sedema, Faradizer M) with respect to the solids content.

EXAMPLE 35

A catalyst according to example 9 was prepared, wherein the coating dispersion contained an additional 15 wt.% of zirconium oxide (BET surface area 52 $m^2/g$) stabilized with cerium oxide and 6 wt.% of barium oxide in the form of barium acetate with respect to the solids content.

EXAMPLE 36

A catalyst according to example 14 was prepared, wherein the coating dispersion contained an additional 20 wt.% of cerium oxide (specific surface area: 85 $m^2/g$) stabilized with zirconium oxide and 4 wt.% of calcium oxide in the form of calcium acetate and 2 wt.% of potassium oxide in the form of potassium acetate, each being with respect to the solids content of the dispersion.

EXAMPLE 37

A catalyst according to example 17 was prepared, wherein the coating dispersion contained an additional 15 wt.% of silver oxide, introduced as silver nitrate, with respect to the solids content.

TABLE 2

Composition of the catalysts

| Example | Noble metal | Noble metal content [g/dm$^3$] | $Al_2O_3/SiO_2$ ratio | Aluminum silicate content [g/dm$^3$] | Other oxides [g/dm$^3$] |
| --- | --- | --- | --- | --- | --- |
| C1 | Pt | 1.76 | 95/5[a] | 200 | |
| C2 | Pt | 1.76 | 95/5[a] | 200 | 5 $V_2O_5$ |
| C3 | Pt | 1.76 | 95/5[b] | 200 | |
| E1 | Pt | 1.76 | 95/5 | 200 | |
| E2 | Pt | 1.76 | 95/5 | 200 | 0.5 $V_2O_5$ |
| E3 | Pt | 1.76 | 95/5 | 200 | 5 $V_2O_5$ |
| E4 | Pt | 1.76 | 95/5 | 200 | 10 $V_2O_5$ |
| E5 | Pt | 1.76 | 95/5 | 140 | |
| E6 | Pt | 1.76 | 95/5 | 100 | |
| E7 | Pt | 1.76 | 95/5 | 140 | 1 $V_2O_5$ |
| E8 | Pt | 1.76 | 95/5 | 100 | 1 $V_2O_5$ |
| E9 | Pd | 1.76 | 95/5 | 200 | |
| E10 | Pt | 1.76 | 95/5 | 200 | |
| E11 | Rh | 1.76 | 95/5 | 200 | |
| E12 | Pt/Ir 2:1 | 1.76 | 95/5 | 200 | |
| E13 | Pt/Pd 2:1 | 1.76 | 95/5 | 200 | |
| E14 | Pt/Rh 5:1 | 1.76 | 95/5 | 200 | |
| E15 | Pt | 0.88 | 95/5 | 200 | |
| E16 | Pt | 0.44 | 95/5 | 200 | |
| E17 | Pt | 0.22 | 95/5 | 200 | |
| E18 | Pt | 1.76 | 98.5/1.5 | 200 | |
| E19 | Pt | 1.76 | 90/10 | 200 | |
| E20 | Pt | 1.76 | 80/20 | 200 | 1 $V_2O_5$ |
| E21 | Pt | 1.76 | 70/30 | 200 | 1 $V_2O_5$ |
| E22 | Pt | 1.76 | 60/40 | 200 | 1 $V_2O_5$ |
| E23 | Pt | 1.76 | 95/5 | 200 | 5 $V_2O_5$[c] |
| E24 | Pt | 1.76 | 95/5 | 200 | |
| E25 | Pt | 1.76 | 95/5 | 200 | |
| E26 | Pt | 1.76 | 95/5 | 200 | |
| E27 | Pt | 1.76 | 95/5 | 200 | |
| E28 | Pt | 1.76 | 95/5 | 200 | |
| E29 | Pt | 1.76 | 95/5 | 200[e] | 10 $WO_3$[d] |
| E30 | Pt | 1.76 | 93.5/5 | 200 | |
| E31 | Pt | 1.76 | 95/5 | 200 | 10 $SiO_2$ |
| E32 | Pt | 1.76 | 95/5 | 180 | 20 $ZrO_2$ |
| E33 | Pt | 1.76 | 95/5 | 160 | 40 Cu-ZSM5 |
| E34 | Pt | 1.76 | 95/5 | 180 | 20 $MnO_2$ |
| E35 | Pd | 1.76 | 95/5 | 158 | 42 Zr/Ce/Ba |
| E36 | Pt/Rh 5:1 | 1.76 | 95/5 | 148 | 52 Ce/Zr/Ca/K |
| E37 | Pt | 0.22 | 95/5 | 170 | 30 AgO |

[a] as a physical mixture of $Al_2O_3$ and $SiO_2$
[b] according to EP 0 184 506
[c] $V_2O_5$ added as $KVO_3$
[d] $WO_3$ added as ammonium meta tungstate
[e] aluminum silicate stabilized with $La_2O_3$

Application Example

The catalytic activity of the exhaust gas purification catalysts in the preceding examples was measured using a synthetic gas test unit. Using this unit it is possible to simulate all the gaseous components present in real exhaust gas from a diesel or gasoline engine.

The test conditions selected and the model gas composition are listed in Table 3. The measuring equipment in Table 4 was used to measure the gas components contained in the exhaust gas.

TABLE 3

Test conditions and model gas composition for determining the rates of conversion of the pollutants CO, HC, NO$_x$ and SO$_2$ in the synthetic gas unit

| Component | Concentration |
| --- | --- |
| CO | 350 [vppm] |
| $H_2$ | 117 [vppm] |
| $C_3H_6$ | 800 [vppm] |
| $SO_2$ | 25 [vppm] |
| NO | 270 [vppm] |
| $O_2$ | 6 [vol. %] |
| $H_2O$ | 10 [vol. %] |

TABLE 3-continued

Test conditions and model gas composition for determining the rates of conversion of the pollutants CO, HC, $NO_x$ and $SO_2$ in the synthetic gas unit

| Component | Concentration |
| --- | --- |
| $CO_2$ | 10.7 [vol. %] |
| $N_2$ | remainder |
| Amount of gas | 1950 [Nl/h] |
| Size of catalyst | ⌀ 25 mm × 76 mm |
| Engine speed | 50,000 [h$^{-1}$] |
| Heating | 25° C. steps |
|  | Waiting time: 15 min |

TABLE 4

List of measuring equipment for measuring exhaust gas concentrations in the synthetic gas test unit

| Gas analyzed | Name of equipment | Manufacturer |
| --- | --- | --- |
| $O_2$ | Oxymat | Siemens AG |
| hydrocarbons | FID | Pierburg Meβtechnik |
| $NO_x$ | CLD 700 Ehlt | Zellweger ECO-Systeme |
| CO | Binos | Rosemount |
| $CO_2$ | Binos | Rosemount |
| $SO_2$ | Binos | Rosemount |

The synthetic gas test unit was used to measure the light-off temperatures of the catalysts for the conversion of carbon monoxide and hydrocarbons as well as the rates of conversion for carbon monoxide, hydrocarbons and nitrogen monoxide producible under continuous operation at exhaust gas temperature of 225° C. and for the oxidation of $SO_2$ to $SO_3$ at exhaust gas temperatures of 450° C. The light-off temperatures are the exhaust gas temperatures at which 50% of the particular pollutant is converted by the catalyst. To determine the light-off temperatures, the exhaust gas was heated up in steps of 25° C. with a waiting period of 15 minutes after each step.

The measurements were performed using fresh catalysts and also after oven-ageing of the catalysts for 16 h at 750° C. in air. The engine speed for all measurements was 50,000 h$^{-1}$.

The following formula was used to calculate the rates of conversion:

$$X = \frac{N_E - N_A}{N_E} \cdot 100 \, [\%]$$

X=rate of conversion [%]

$N_E$=concentration of pollutant before the catalyst [vppm]

$N_A$=concentration of pollutant after the catalyst [vppm]

The pollutant conversions produced with the catalysts in the comparison examples and examples 1–37 are listed in Tables 5 and 6. Table 5 gives the performance data for fresh catalysts whereas the results in Table 6 were obtained with catalysts which had been subjected to oven ageing for 16 hours at 750° C. in air.

TABLE 5

Pollutant conversion by the catalysts in examples E1–E3 and C1–C3 in the process according to the invention

| | $T_{50\%}$ °C. | | Conversion [%] at 225° C. | | | $SO_2$ oxidation at 450° C. |
| --- | --- | --- | --- | --- | --- | --- |
| Example | CO | HC | CO | HC | $NO_x$ | $SO_2$ |
| C1 | 179 | 215 | 89 | 84 | 2 | 69 |
| C2 | 181 | 217 | 88 | 83 | 1 | 18 |
| C3 | 175 | 245 | 75 | 80 | 0 | 5 |
| E1 | 155 | 210 | 95 | 90 | 55 | 45 |
| E2 | 155 | 215 | 95 | 90 | 55 | 30 |
| E3 | 160 | 218 | 95 | 90 | 55 | 21 |
| E4 | 160 | 220 | 94 | 89 | 53 | 15 |
| E5 | 150 | 210 | 94 | 89 | 58 | 45 |
| E6 | 150 | 211 | 95 | 91 | 58 | 46 |
| E7 | 152 | 210 | 95 | 91 | 54 | 29 |
| E8 | 153 | 212 | 93 | 90 | 55 | 32 |
| E9 | 285 | 265 | 25 | 38 | 15 | 35 |
| E10 | 150 | 208 | 95 | 89 | 60 | 45 |
| E11 | 175 | 215 | 95 | 91 | 50 | 40 |
| E12 | 185 | 225 | 90 | 87 | 48 | 45 |
| E13 | 175 | 218 | 89 | 89 | 25 | 41 |
| E14 | 170 | 217 | 90 | 90 | 47 | 80 |
| E15 | 165 | 220 | 90 | 90 | 45 | 35 |
| E16 | 165 | 225 | 90 | 89 | 20 | 20 |
| E17 | 171 | 227 | 85 | 85 | 10 | 19 |
| E18 | 160 | 210 | 93 | 90 | 35 | 40 |
| E19 | 161 | 211 | 95 | 91 | 55 | 40 |
| E20 | 159 | 209 | 94 | 89 | 50 | 42 |
| E21 | 163 | 210 | 93 | 90 | 45 | 38 |
| E22 | 162 | 209 | 94 | 91 | 40 | 39 |
| E23 | 157 | 215 | 95 | 89 | 54 | 31 |
| E24 | 151 | 214 | 91 | 90 | 53 | 41 |
| E25 | 155 | 220 | 89 | 87 | 50 | 28 |
| E26 | 155 | 221 | 89 | 89 | 40 | 24 |
| E27 | 165 | 230 | 86 | 87 | 38 | 23 |
| E28 | 145 | 205 | 95 | 91 | 59 | 42 |
| E29 | 150 | 209 | 93 | 90 | 51 | 22 |
| E30 | 153 | 215 | 90 | 86 | 35 | 40 |
| E31 | 155 | 218 | 93 | 90 | 55 | 45 |
| E32 | 155 | 215 | 90 | 90 | 40 | 29 |
| E33 | 151 | 207 | 92 | 91 | 48 | 49 |
| E34 | 155 | 215 | 89 | 85 | 49 | 38 |
| E35 | 150 | 210 | 94 | 90 | 30 | 50 |
| E36 | 175 | 221 | 89 | 88 | 49 | 25 |
| E37 | 175 | 230 | 85 | 85 | 9 | 17 |

TABLE 6

Pollutant conversion by the catalysts in selected examples after ageing (16 h, 750° C., air)

| | $T_{50\%}$ °C. | | Conversion [%] at 225° C. | | | $SO_2$ oxidation % at 450° C. |
| --- | --- | --- | --- | --- | --- | --- |
| Example | CO | HC | CO | HC | $NO_x$ | $SO_2$ |
| E1 | 165 | 221 | 90 | 90 | 50 | 21 |
| E2 | 168 | 225 | 90 | 86 | 50 | 15 |
| E4 | 175 | 228 | 85 | 83 | 48 | 9 |
| E5 | 163 | 221 | 89 | 87 | 50 | 22 |
| E6 | 165 | 225 | 86 | 86 | 45 | 25 |
| E8 | 165 | 220 | 91 | 89 | 52 | 19 |
| E15 | 170 | 229 | 85 | 90 | 40 | 17 |
| E16 | 175 | 235 | 84 | 80 | 10 | 10 |
| E17 | 185 | 255 | 85 | 65 | 5 | 10 |
| E18 | 170 | 225 | 90 | 88 | 25 | 22 |
| E20 | 110 | 220 | 91 | 88 | 48 | 25 |
| E22 | 171 | 219 | 90 | 89 | 37 | 20 |
| E26 | 170 | 230 | 87 | 85 | 35 | 11 |

The conversion measurements in Tables 5 and 6 clearly demonstrate the unexpected advantages of the process according to the invention. When using homogeneous aluminum silicate as a high surface area support oxide for the catalytically active components, high degrees of reaction are surprisingly produced for nitrogen monoxide in addition to the conversion of hydrocarbons and carbon monoxide. In contrast, a physical mixture of aluminum oxide and silicon dioxide, as in the comparison example, leads to only minimal conversion of nitrogen monoxide.

The catalyst containing manganese oxide according to example 34 gives approximately the same conversion rates for the pollutants $NO_x$, CO and HC (hydrocarbons) as the catalyst according to example 1, but in addition has the advantage of largely suppressing the release of foul-smelling hydrogen sulphide when changing over from lean-burn to the fat mode of operation.

The catalyst in example 35 has an improved low temperature conversion of pollutants and an improved nitrogen oxide conversion during dynamic modes of operation as compared with the catalyst in example 9.

The catalyst in example 36 exhibits only a slightly increased nitrogen oxide conversion as compared with the catalyst in example 14, but under dynamic modes of operation leads to much better rates of conversion for all three pollutants.

Although, the catalyst in comparison example 3 has equally good conversion rates for carbon monoxide and hydrocarbons, it has much lower rates of conversion for nitrogen monoxide than the catalyst according to the invention in example 1.

The catalyst in example 37 exhibits only slightly reduced rates of conversion for nitrogen oxide as compared with the catalyst in example 17 but leads to much higher rates of conversion for oxygen-containing organic compounds. In a separate test ethanol ($C_2H_5OH$) vapor was introduced instead of propene ($C_3H_6$) into the exhaust gas of table 3 at a concentration of 800 vppm. The exhaust gas was at a temperature of 225° C. as in the previous experiments. The conversion of ethanol at the catalyst of example 17 was 65% and at the catalyst of example 37 was 89%.

Degree of dispersion of the platinum qroup metals:

The degrees of dispersion of platinum group metals in the catalysts in the comparison examples and in a few selected catalysts in examples 1 to 37 were measured. The results are summarized in Table 7. They show, by comparison with the conversion measurements in Table 5, that the catalysts in the examples according to the invention are unexpectedly characterized by a degree of dispersion of between 30 and 70%. In contrast, the catalyst in comparison example 1, with only a low nitrogen oxide conversion capacity and made of a physical mixture of aluminum oxide and silicon dioxide, has a degree of dispersion of only 15%.

Further variations and modifications of the foregoing will be apparent to those skilled in the art and such variations and modifications are intended to be encompassed by the claims that are appended hereto.

TABLE 7

Degrees of dispersion of platinum group metals for catalysts in a few selected examples

| Example | Degree of dispersion $D_{PM}$ [%] |
|---------|----------------------------------|
| E1      | 63                               |
| E2      | 55                               |
| E4      | 56                               |
| E10     | 50                               |
| E18     | 51                               |
| E22     | 35                               |
| C1      | 15                               |

We claim:

1. A process for simultaneously reducing the amounts of hydrocarbons, oxygen-containing organic compounds, carbon monoxide and nitrogen oxides contained in the exhaust gas from an internal combustion engine operating under conditions of excess oxygen, comprising passing said exhaust gas over a catalyst consisting essentially of a gas-permeable inert carrier having a catalytically active coating containing at least one metal from the platinum group, at least one high surface area support material, and optionally at least one base metal compound, wherein said high surface area support material contains an aluminum silicate which has a specific surface area of at least 150 $m^2/g$ after calcining, wherein the calcining is carried out for 7 hours at 950° C. in the presence of a synthetic exhaust gas containing 10 vol. % of carbon dioxide, 6 vol. % of oxygen, 10 vol. % of water vapor with the remainder being nitrogen, wherein said aluminum silicate contains 0.5 to 40 wt. % of silicon dioxide.

2. The process according to claim 1, wherein said aluminum silicate is homogeneous.

3. The process according to claim 1, wherein said aluminum silicate contains up to 10 wt. %, calculated as an oxide, of at least one homogeneously incorporated element selected from the group consisting of rare earths, alkaline earth metals, zirconium and mixtures thereof which can form an oxide which is stable at elevated temperatures.

4. The process according to claim 1, wherein said base metal compound is selected from the group consisting of molybdenum, tungsten, vanadium, zirconium, hafnium, germanium, manganese, iron, nickel, cobalt, zinc, copper, silver, alkali metal, alkaline earth metal, rare earth and mixtures thereof.

5. The process according to claim 1, wherein said base metal compound is tungsten, vanadium, or tungsten and vanadium.

6. The process according to claim 1, wherein said coating contains up to 50 wt. %, with respect to the weight of said coating, of at least one high surface area support material selected from the group consisting of silicon dioxide, titanium oxide, zirconium oxide, zeolite, aluminum oxide, magnesium oxide and mixtures thereof.

7. The process according to claim 1, wherein said coating contains up to 25 wt. %, with respect to the weight of said coating, of at least one high surface area support material.

8. The process according to one of claim 1, wherein said catalytically active coating is present on said carrier in an amount of 20 to 400 g/l.

9. The process according to one of claim 1, wherein said catalytically active coating contains 0.01 to 5 g/l of at least one metal from the platinum group and optionally up to 100 g/l of at least one base metal compound, calculated as an oxide.

10. The process according to claim 1, wherein said metal from the platinum group is selected from the group consisting of platinum, palladium, rhodium, iridium and mixtures thereof.

11. The process according to claim 1, wherein said metal from the platinum group is platinum, palladium or platinum and palladium.

12. The process to claim 1, wherein said catalytically active coating contains at least one base metal compound and wherein the ratio of the total amount of catalytically active coating to the platinum group metal amount plus the base metal compound amount is less than 500 wherein said base metal compound amount is calculated as an oxide.

13. The process according to claim 1, wherein said aluminum silicate contains an alkali metal, calculated as the oxide, in an amount of less than 75 ppm.

14. The process according to claim 1, wherein said support is a solid structure with exhaust gas channels wherein the density of said exhaust gas channels over the cross-section of said structure is between 7 and 200 $cm^{-2}$ and the partitions between said channels are between 0.02 and 0.3 mm thick.

15. The process according to claim 1, wherein the degree of dispersion $D_{PM}$ of said metal from the platinum group in said catalyst is between about 30 and 70%.

16. The process according to claim 1, wherein said aluminum silicate is not a zeolite.

* * * * *